United States Patent Office 3,292,220
Patented Dec. 20, 1966

3,292,220
METHOD OF MAKING SHELL MOULDS
Harold Garton Emblem, Grappenhall, and Earl Whiteway Fothergill, Liverpool, England, assignors to Philadelphia Quartz Company, Philadelphia, Pa., a corporation of Pennsylvania
No Drawing. Filed Nov. 5, 1963, Ser. No. 321,425
Claims priority, application Great Britain, Nov. 16, 1962, 43,526/62
10 Claims. (Cl. 22—196)

This invention relates to the manufacture of moulds for the casting of metals and is more particularly concerned with the manufacture of what are known as shell moulds.

According to the invention there is provided a method of making a shell mould which comprises applying to an expendable pattern alternately a coating of a gel-forming acid-hydrolysed alkyl silicate solution and a coating of a quaternary ammonium silicate solution, at least one of the two solutions having refractory material suspended therein, the quaternary ammonium silicate solution acting to cause the gelation of the coating of the acid-hydrolysed silicate solution. Each coating is preferably dusted with refractory powder before the next is applied. A sufficient number of coatings are applied to give a shell of the desired thickness. By a gel-forming acid-hydrolysed alkyl silicate solution we mean one which can be made to set to a gel by the action of a base.

The acid-hydrolysed silicate solution may be prepared from a lower alkyl silicate such as methyl, ethyl, isopropyl or n-butyl silicate; the silicate may be an orthosilicate material or a poly-silicate material or a mixture of these. The preferred alkyl silicates are the ethyl and isopropyl silicates. Methods of preparing acid-hydrolysed solutions of ethyl and isopropyl silicates are desrcibed in The Industrial Chemist, February 1957, pages 55–58, Metallurgia, January 1950, pages 157–159, patent specification 3,070,861, and application Serial No. 132,602, now Patent No. 3,146,252. The acid-hydrolysed solution preferably has a silica concentration of between 10 and 25% by weight.

Suitable quaternary ammonium silicates are those described and claimed in copending application Serial No. 50,877, now Patent No. 3,239,549, or in patent specification 2,689,245. The preferred silicates are those free or substantially free of alkali metal such as those described in copending application Serial No. 131,490, now Patent No. 3,239,521. Of particular value are the tetraethanolammonium silicates.

Suitable refractory materials which may be suspended in the hydrolysed silicate solution and/or the quaternary ammonium silicate solution include sillimanite, zircon, zirconia, alumina, silica and molochite. These same materials may also be used for the dusting of the applied coatings.

The expendable pattern may if desired be given a primary coating of, for example, a suspension of a refractory material in an electrolyte-free silica aquasol. Other known primary coating compositions can also be used.

It is preferred that both the hydrolysed silicate solution and the quaternary ammonium silicate solution have refractory powder suspended in them and that the first coating applied to the expendable pattern is that of the suspension of refractory material in the acid-hydrolysed silicate solution.

The shell mould structure prepared in accordance with the invention may be made sufficiently thick to permit casting therein without any external support or with a loose refractory support. However, relatively thin shells may be produced which are subsequently invested in a slurry of refractory material and a bonding liquid in a known manner.

A particularly suitable procedure for carrying out the process of the invention is the following. The expendable pattern, which may be of wax or of some other suitable material of low melting point or of a plastics material such as polystyrene, is dipped into a slurry of fine refractory material in the acid-hydrolysed silicate solution, excess slurry is allowed to drain off and the wet coating is then dusted with refractory powder. The pattern is then dipped into a slurry of refractory powder in the quaternary ammonium silicate solution and excess again allowed to drain off. This second coating is also dusted with refractory powder and the pattern then allowed to stand for a time sufficient to allow for the gelation of the acid-hydrolysed silicate solution by the action of the quaternary ammonium silicate. The acid-hydrolysed silicate solution may also cause the gelation of the quaternary ammonium silicate solution. This sequence is then repeated so as to build up a shell of the desired thickness; usually, repeating the sequence three or four times giving six or eight coatings gives a shell of adequate thickness. Finally a sealing coat is preferably applied by dipping in the acid-hydrolysed silicate slurry; this coating is not dusted. By this procedure a complete shell can be constructed in a short time. Completed shells have been produced by this procedure in about 10 minutes. The completed shell is then allowed to stand for at least 2 hours, preferably for at least 24 hours, to dry before the pattern is removed and the mould fired. In the case of a wax pattern, the dried shell is preferably put into a furnace at, for example, about 1,000° C. so that the pattern removal and the firing can be effected in a single operation. The time for firing will vary from about 2 to 8 hours depending on the size and complexity of the shell.

The following examples illustrate the invention.

*Example 1*

A first slurry was prepared by suspending 12 lbs of zircon, all passing a 200 mesh B.S. sieve, in 3 lbs. of an acid-hydrolysed isopropyl silicate solution containing about 17% $SiO_2$ by weight. The hydrolysed solution was prepared by adding 100 vols. of isopropyl silicate (37–39% $SiO_2$) to a mixture of 100 vols. of isopropanol (containing 1% water by volume), 20 vols. of water and 5 vols. of N/1 hydrochloric acid solution, and stirring vigorously until the mixture became clear. The hydrolysed silicate solution was left for 24 hours after it cleared, before being mixed with the zircon powder.

A second slurry was prepared by suspending 200 g. of zircon, all passing a 200 mesh B.S. sieve, in a mixture of 50 g. of a tetraethanolammonium silicate solution (substantially free of alkali metal) having a silica content of 25.4% by weight and in which the molar $SiO_2$: (tetraethanolammonium ion) ratio was 9.29:1.

A wax pattern was then dipped into the first slurry, excess allowed to drain off and the wet coating dusted with sillimanite of −30 +80 I.M.M. sieve grading. The pattern was then dipped into the second slurry, excess allowed to drain off, the coating dusted with the sillimanite powder and the pattern allowed to stand for about 1 minute to allow for the gelation of the hydrolysed isopropyl silicate solution by the action of the alkaline quaternary ammonium silicate. It is believed that the quaternary ammonium silicate was also caused to gel by the action of the acid-hydrolysed silicate solution. This procedure was then repeated four times after which a final sealing coat was applied by dipping the pattern into the first slurry again. The completed shell was then left for 24 to 48 hours to dry before de-waxing and firing which was effected by placing the dried shell into a furnace at 1,000° C. for 2 to 8 hours. Metal may be cast into the fired shell while still hot.

*Example 2*

An acid-hydrolysed ethyl silicate solution was prepared by mixing in the order given:

| | Ml. |
|---|---|
| Ethyl silicate (containing about 40% $SiO_2$ by weight) | 250 |
| Isopropyl alcohol (containing 1% water by volume) | 250 |
| N/1 hydrochloric acid solution | 125 |
| Water | 50 |

The hydrolysate was allowed to stand 16 hours before use.

A first slurry was prepared by mixing 400 grams of molochite with 120 grams of the above hydrolysate, and 120 grams of water.

A second slurry was prepared by suspending 400 grams of molochite in 240 grams of the tetraethanolammonium silicate solution used in Example 1. The shell was built following the procedure of Example 1, again using sillimanite of −30 +80 I.M.M. grading for dusting. Drying, de-waxing and firing were as described in Example 1.

The molochite used was of such a grade that substantially all of it passed a 200 mesh B.S. sieve.

What is claimed is:

1. A method of making a shell mould which comprises applying to an expendable pattern alternately a coating of a gel forming acid-hydrolysed alkyl silicate solution and a coating of a quaternary ammonium silicate solution, at least one of the two solutions having refractory material suspended therein, the quaternary ammonium silicate solution acting to cause the gelation of the acid-hydrolysed solution.

2. A method as claimed in claim 1, in which both the acid-hydrolysed silicate solution and the quaternary ammonium silicate solution have refractory powder suspended in them.

3. A method as claimed in claim 1, in which each coating is dusted with refractory powder before the next coating is applied.

4. A method as claimed in claim 1, comprising the steps of (1) dipping an expendable pattern into a slurry of refractory material in the acid-hydrolysed silicate solution, (2) allowing excess slurry to drain off, (3) dusting the wet coating with refractory powder, (4) dipping the pattern into a slurry of refractory powder in quaternary ammonium silicate solution, (5) allowing excess slurry to drain off, (6) dusting the wet coating with refractory powder, (7) allowing the pattern to stand for a time sufficient to allow for the gelation of the acid-hydrolysed solution; and repeating steps 1 to 7 until a shell of the desired thickness has been built up.

5. A process according to claim 1 wherein a final coating is applied by dipping the pattern into the slurry of refractory powder in the acid-hydrolysed silicate solution.

6. A method as claimed in claim 1, wherein the acid-hydrolysed silicate solution is an acid-hydrolysed solution of an alkyl silicate in which the alkyl group contains from 1 to 4 carbon atoms.

7. A method as claimed in claim 6, wherein the alkyl silicate is selected from the class consisting of ethyl and isopropyl silicates.

8. A method as claimed in claim 1, wherein the hydrolysed solution has a silica concentration of 10–25% by weight.

9. A method as claimed in claim 1, wherein the quaternary ammonium silicate is free or substantially free of alkali metal.

10. A method as claimed in claim 1, wherein the quaternary ammonium silicate is a tetraethanolammonium silicate.

References Cited by the Examiner
UNITED STATES PATENTS

| 2,601,352 | 6/1952 | Wolter | 106—38.3 |
| 2,806,270 | 9/1957 | Shaul | 22—196 |
| 2,948,032 | 8/1960 | Reuter | 22—193 |
| 3,024,125 | 3/1962 | Lee. | |

J. SPENCER OVERHOLSER, *Primary Examiner.*

MARCUS U. LYONS, *Examiner.*

E. MAR, *Assistant Examiner.*